(12) United States Patent
Hutchins

(10) Patent No.: US 9,433,146 B2
(45) Date of Patent: Sep. 6, 2016

(54) FRONT GUARD FOR A STRING TRIMMER

(71) Applicant: Vernon Dwain Hutchins, Carencro, LA (US)

(72) Inventor: Vernon Dwain Hutchins, Carencro, LA (US)

( * ) Notice: Subject to any disclaimer, the term of this patent is extended or adjusted under 35 U.S.C. 154(b) by 30 days.

(21) Appl. No.: 14/574,388

(22) Filed: Dec. 17, 2014

(65) Prior Publication Data

US 2015/0173293 A1 Jun. 25, 2015

Related U.S. Application Data

(60) Provisional application No. 61/916,846, filed on Dec. 17, 2013.

(51) Int. Cl.
*A01D 34/416* (2006.01)

(52) U.S. Cl.
CPC .................. *A01D 34/4167* (2013.01)

(58) Field of Classification Search
CPC .................................................. A01D 34/4167
See application file for complete search history.

(56) References Cited

U.S. PATENT DOCUMENTS

| | | | | |
|---|---|---|---|---|
| 3,848,838 A * | 11/1974 | Thomas | A47C 7/66 | 248/231.51 |
| 4,756,084 A * | 7/1988 | Morita | A01D 34/84 | 172/15 |
| 5,010,720 A * | 4/1991 | Corsi | A01D 34/4167 | 56/320.1 |
| 5,048,187 A * | 9/1991 | Ryan | A01D 75/206 | 30/276 |
| 5,060,383 A * | 10/1991 | Ratkiewich | A01D 34/4167 | 30/276 |
| 5,924,205 A * | 7/1999 | Sugihara | A01D 34/4167 | 30/276 |
| 5,950,317 A * | 9/1999 | Yates | A01D 34/90 | 172/13 |
| 5,996,234 A * | 12/1999 | Fowler | A01D 34/90 | 30/276 |
| 6,324,765 B1 * | 12/2001 | Watkins, Sr. | A01D 34/84 | 30/276 |
| 6,665,942 B2 * | 12/2003 | Richardson | A01D 34/4167 | 215/321 |
| 6,757,980 B2 * | 7/2004 | Arsenault | A01D 75/206 | 30/276 |
| 6,941,738 B1 * | 9/2005 | Standish | A01D 34/4167 | 56/12.7 |
| 7,284,331 B2 * | 10/2007 | Paddock | A01D 34/828 | 30/276 |
| 2015/0173293 A1 * | 6/2015 | Hutchins | A01D 34/4167 | 30/276 |

FOREIGN PATENT DOCUMENTS

GB 2459100 B * 9/2012

* cited by examiner

*Primary Examiner* — Hwei C Payer

(57) ABSTRACT

A front guard for a string trimmer is an apparatus that is used to prevent a user from cutting unwanted objects with the string trimmer. The apparatus includes a pliable rod and a flexible guard. The flexible guard is mounted about the spool and line assembly for the string trimmer opposite of its rear guard so that the flexible guard comes into contact with an unwanted object before the wire of the string trimmer comes into contact with the unwanted object. The pliable rod is used to mount the flexible guard to the main shaft of the string trimmer and allows the flexible guard to be moved from its original position.

16 Claims, 8 Drawing Sheets

FRONT GUARD FOR A STRING TRIMMER

The current application claims a priority to the U.S. Provisional Patent application Ser. No. 61/916,846 filed on Dec. 17, 2013.

FIELD OF THE INVENTION

The present invention relates generally to accessories for a hand-held string trimmer. More specifically, the present invention is a retractable guide and guard assembly for the rotating string portion of a hand-held string trimmer.

BACKGROUND OF THE INVENTION

Many homeowners face the problem of cutting grass while having the issue of breaking the trimmer. Currently, there are no effective ways to protect the trimmer from edges. It is therefore an object of the present invention to introduce an apparatus for a weed eater yard guard.

SUMMARY OF INVENTION

The present invention is an apparatus for a weed eater yard guard. The present invention is an attachment that is an add-on and built-in or any way that will make the design work with the weed eater. As a test, the present inventor clipped the part on to the weed eater. The present invention can be clipped onto the shaft manufactured into the guard.

The present invention can comprises any pliable material that can be brought around to the front of the weed eater or if built in a way to twist the guard to the front of the weed eater. The flexible material would guard the front of the weed eater where the string would not hit (normally be the front of the shaft). For example; when weed eating the string comes out the front, the guard in the back allows the string to come out only to the length of the cutter. This does not prevent the user from damaging what is in front being skirting trees plants or other. The protecting front piece would allow the user to pull the grass to the weed eater.

When pushing forward with the weed eater, the user would bring the grass toward the string and the guard preventing the user from damaging what is in front of the weed eater. The present invention functions and as stated can be built in, clipped on snapped onto shaft or any way that would allow the user to attach it.

The present invention can also be adjustable by hand bending material hinge screws or any way that would allow adjustment. When attached to weed eater, it will protect property from damaging effects of weed eater string on your property. The idea is to have flexible material to protect the front strings. Material can be used to pull grass away and flexible enough to push the head with string to hit guard protecting the user's property.

DETAIL DESCRIPTIONS OF THE INVENTION

All illustrations of the drawings are for the purpose of describing selected versions of the present invention and are not intended to limit the scope of the present invention.

Figure 1:
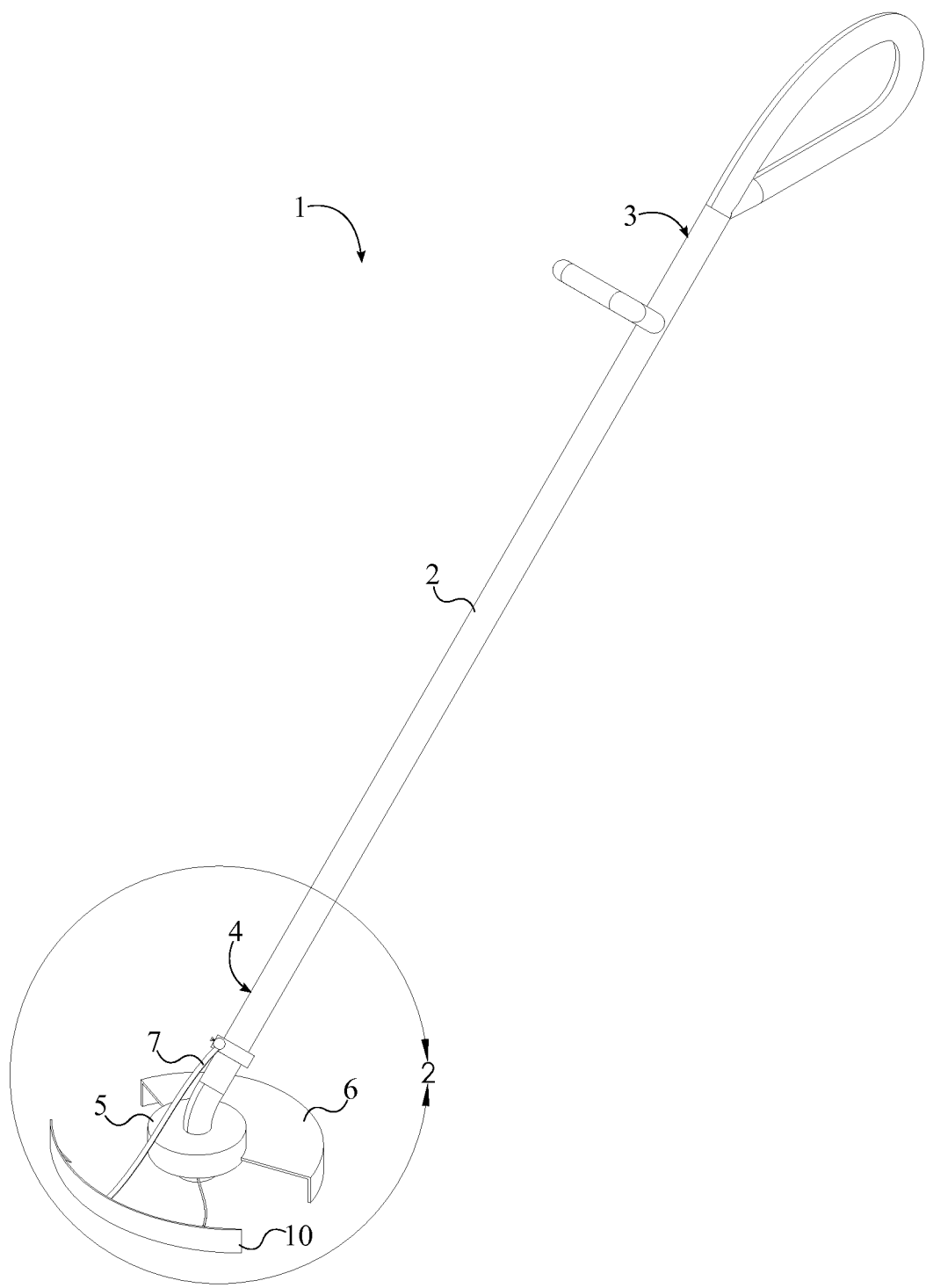
FIG. 1 is a top perspective view of the present invention.
Figure 3:
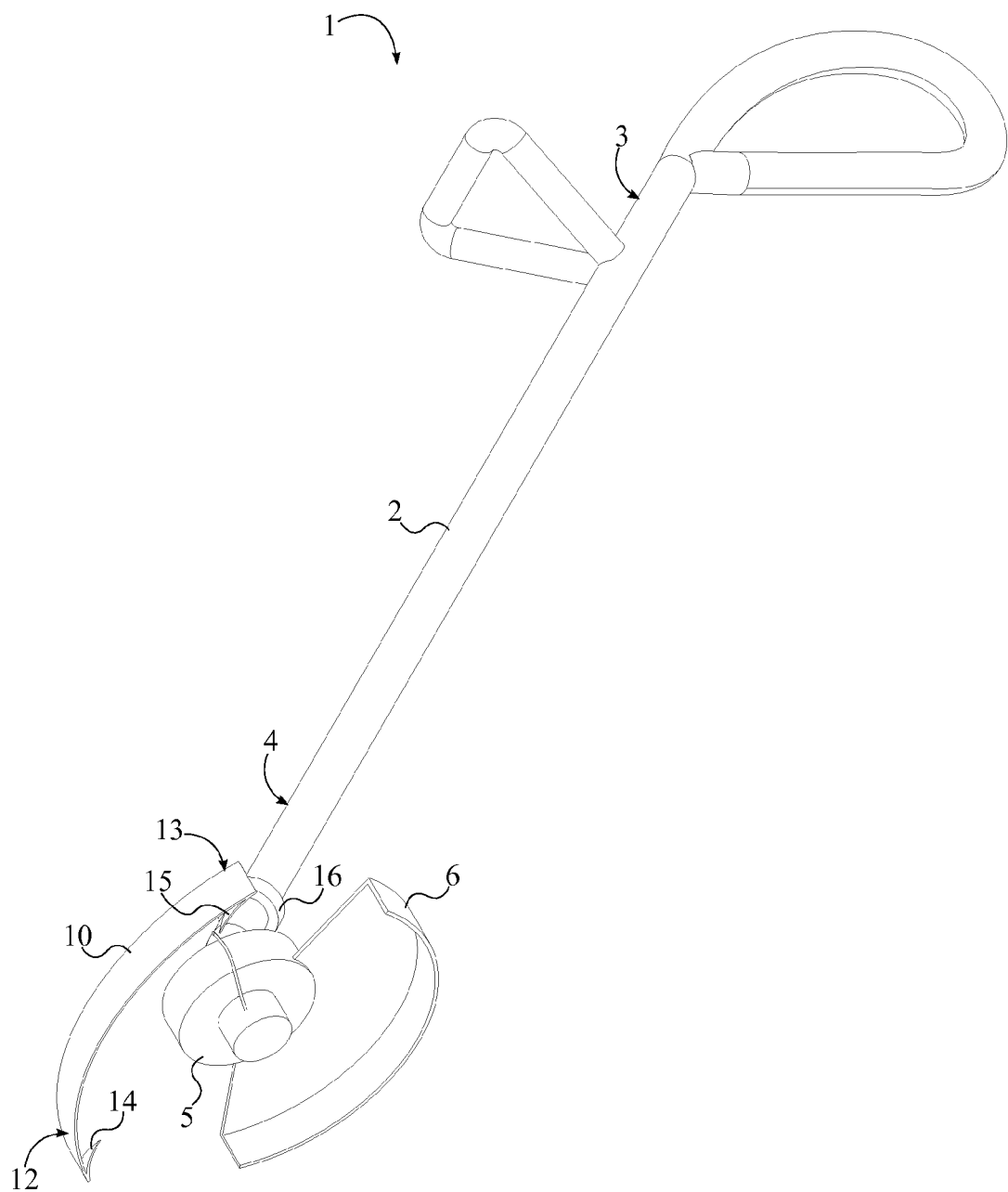
FIG. 3 is a bottom perspective view of the present invention.
Figure 8:
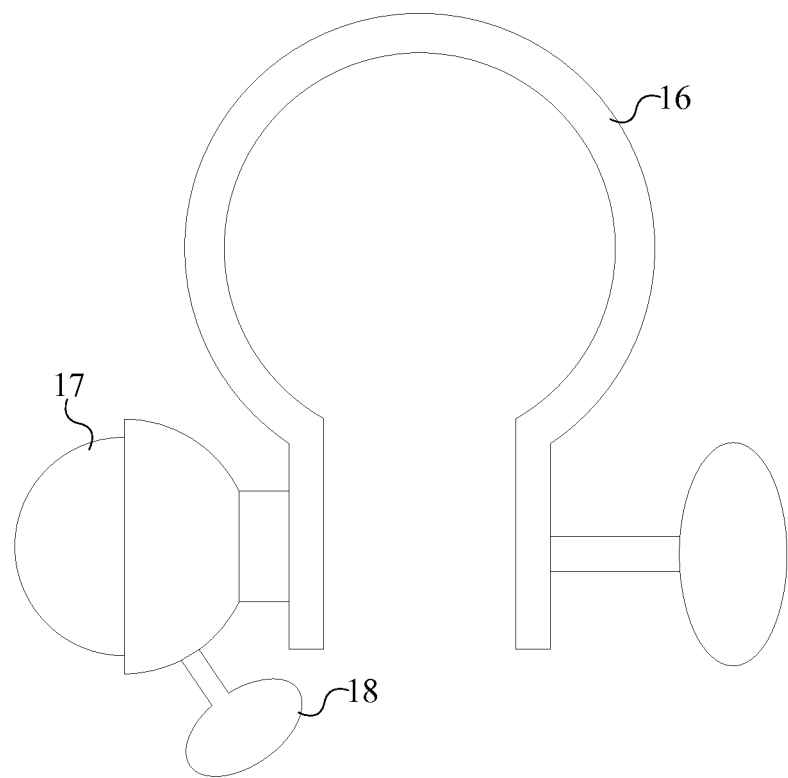
FIG. 8 is a top view of the clamp, pivotable joint, and locking mechanism for the present invention.

As can be seen FIGS. 1, 3, and 8, the present invention is a front guard for a string trimmer 1 (also known as a weed eater or weed whacker) and prevents a user from cutting unwanted objects with the string trimmer 1. Thus, the present invention comprises a string trimmer 1, a pliable rod 7, and a flexible guard 10. A typical string trimmer 1 uses a monofilament line instead of a blade to cut and trim grass, foliage, or other kinds of plant life. The flexible guard 10 is used as a stop to prevent the monofilament line from coming in contact with any unwanted objects such as walls, the trunk of a tree, etc. For example, the flexible guard 10 can be pressed up against a wall so that the monofilament line hits the flexible guard 10. This allows the monofilament line to cut the grass near the wall without damaging the wall. The pliable rod 7 is used to hold and adjust the positioning of the flexible guard 10. The pliable rod 7 and the flexible guard 10 are bent out of their original shape so that the string trimmer 1 can cut or trim plants that are near those unwanted objects.

Figure 4:
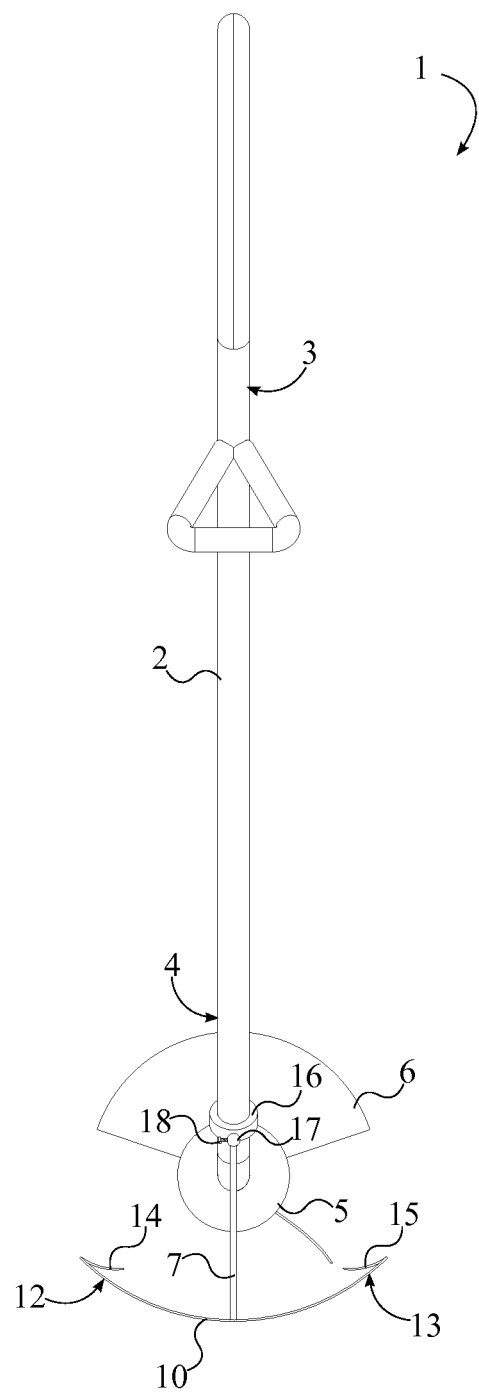
FIG. 4 is a top view of the present invention.
Figure 5:
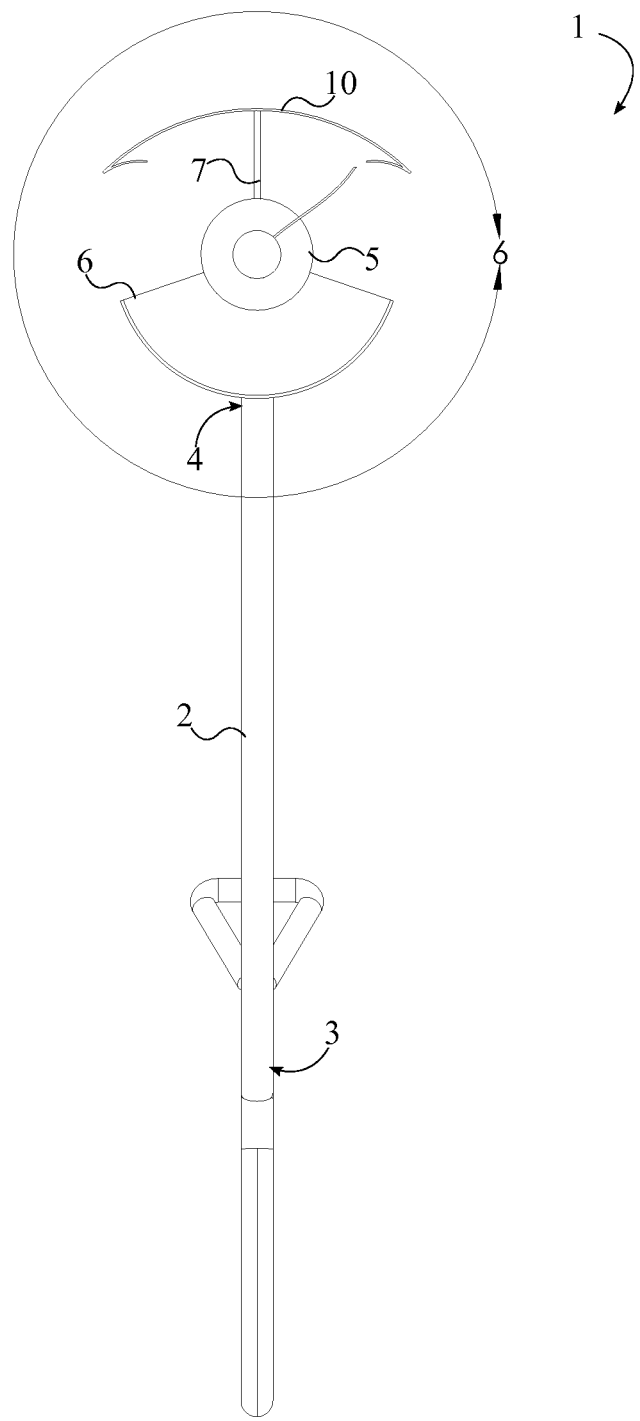
FIG. 5 is a bottom view of the present invention.

As can be seen in FIGS. 4 and 5, some components of the string trimmer 1 that are essential to describing the configuration of the pliable rod 7 and the flexible guard 10 include the main shaft 2, a spool and line assembly 5, and a rear shield 6. The spool and line assembly 5 is used to extend and spin the monofilament line. In addition, the main shaft 2 is the elongated structure that allows the user to maneuver and guide the spool and line assembly 5. The main shaft 2 has an operative end 4 that drives the rotational motion of the spool and line assembly 5 and has a control end 3 that allows the user to handle and to control the string trimmer 1. The rotational motion of the spool and line assembly 5 is typically driven by an electric or gas powered motor on the operative end 4 and, therefore, the spool and line assembly 5 is rotatably mounted to the operative end 4. Finally, the rear shield 6 is used to limit the length of the monofilament line being used by the spool and line assembly 5 and is used to prevent plant trimmings from being thrown onto the user. The rear shield 6 needs to be positioned about the spool and line assembly 5 and needs to be fixed in place to the main shaft 2, adjacent to the to the operative end 4.

The present invention is designed to efficiently and effectively configure the pliable rod 7 and the flexible guard 10 amongst the components of the string trimmer 1. The flexible guard 10 is positioned about the spool and line assembly 5, opposite to the rear shield 6, as a means to stop the monofilament line from coming in contact with any unwanted objects. More specifically, the spinning motion of the monofilament line forms a cutting plane, and the flexible guard 10 is used as a lateral buffer about this cutting plane. The flexible guard 10 is also offset from the spool and line assembly 5 because the monofilament line cannot come in contact with the flexible guard 10 while being spun with the spool and line assembly 5. The flexible guard 10 is suspended to the main shaft 2 by the pliable rod 7, which can be bent by the user to adjust the positioning of the flexible rod.

Figure 2:
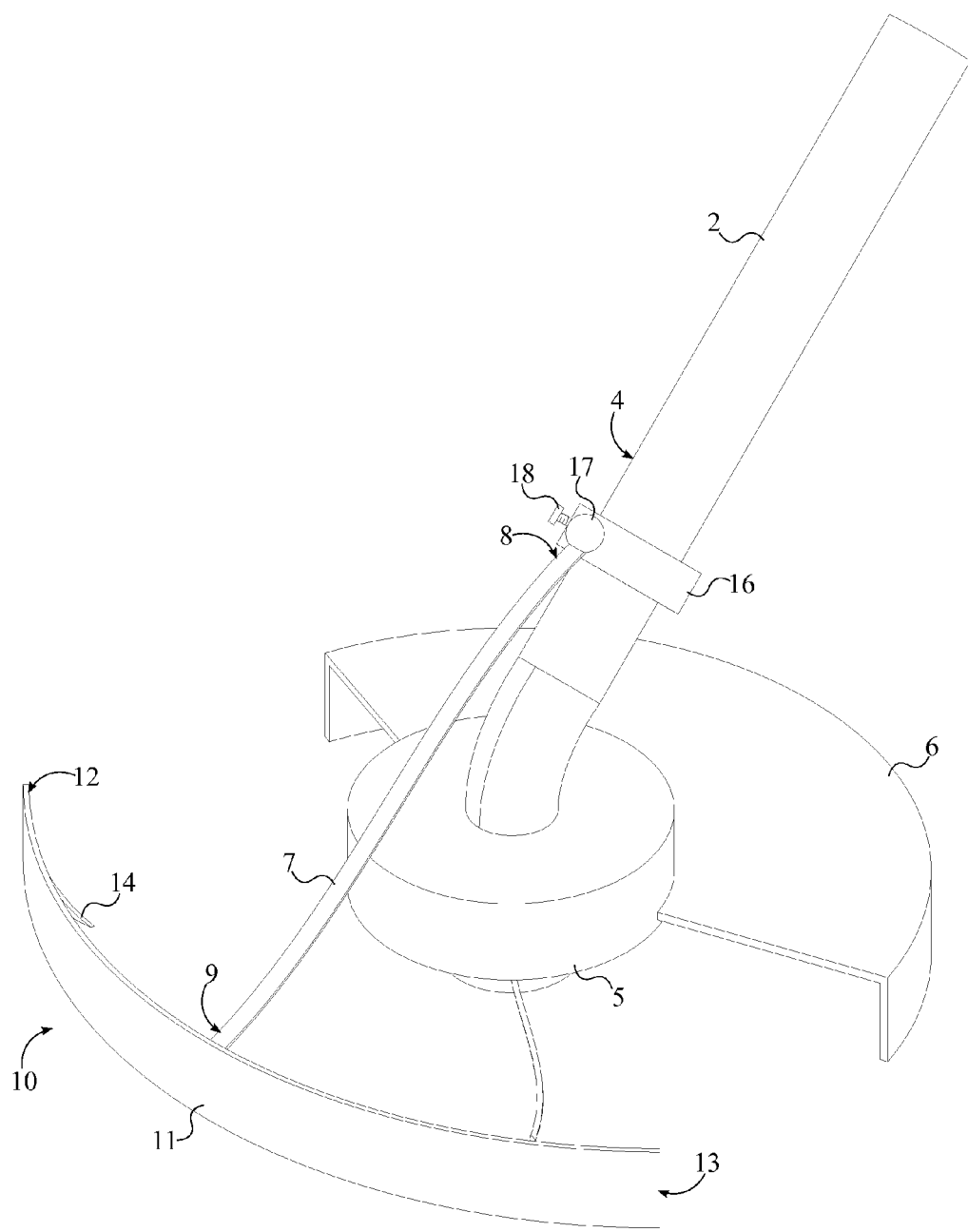
FIG. 2 is a detailed perspective view of the present invention taken about a circle 2 shown in FIG. 1.
Figure 6:
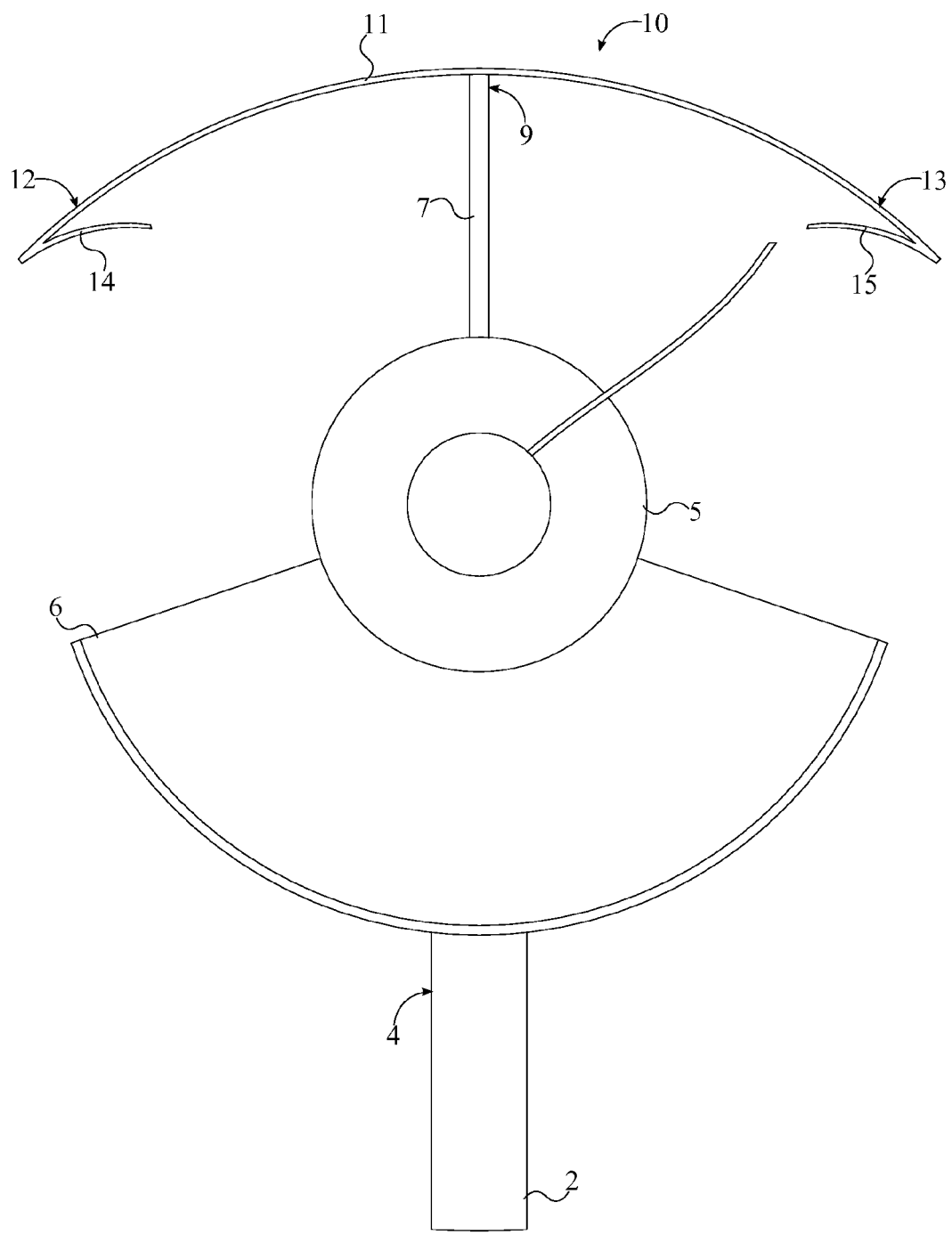
FIG. 6 is a detailed bottom view of the present invention taken about a circle 6 shown in FIG. 5.
Figure 7:
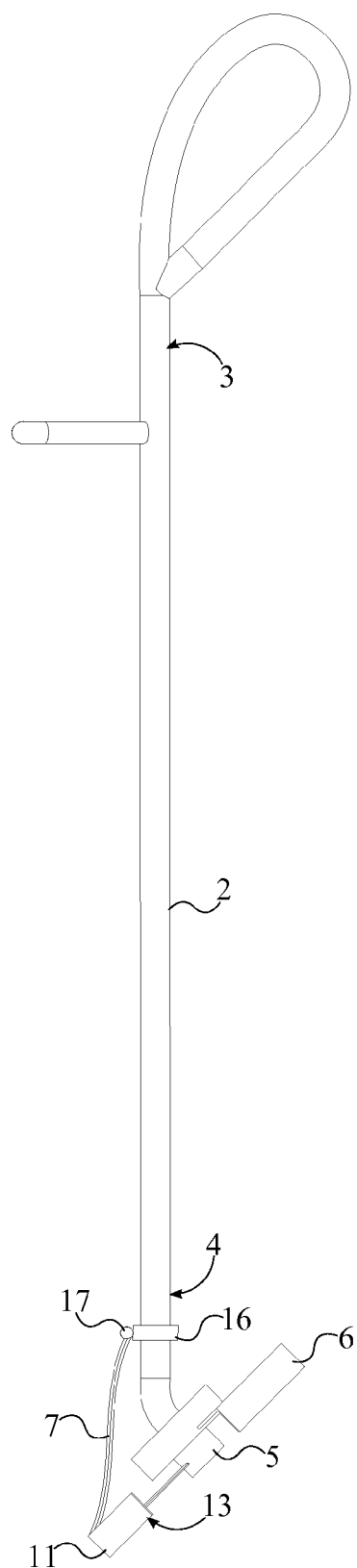
FIG. 7 is a right side view of the present invention.

The flexible guard 10 serves the dual purpose of preventing unwanted objects from coming in contact with the spool and line assembly 5 and raking plants away from unwanted objects so that those plants can be cut or trimmed by the spool and line assembly 5. As can be seen FIGS. 2 and 6, the flexible guard 10 comprises a main body 11, a first prong 14, and a second prong 15. The main body 11 is used to prevent the unwanted objects from coming in contact with the spool and line assembly 5, and, in the preferred embodiment, the main body 11 has an arch shape. The first prong 14 and the second prong 15 extend away from the main body 11 and are used to rake plants away from unwanted objects. For example, the first prong 14 and the second prong 15 can be used rake grass away from a wall so that the spool and line assembly 5 can trim that grass. More specifically, the first prong 14 and the second prong 15 are located on opposite ends of the main body 11. The first prong 14 is connected to the main body 11 at an acute angle, which forms a crevice between the first prong 14 and the main body 11 to grasp and pull plants away from unwanted objects. This crevice is formed at the first end 12 of the main body 11 because the first end 12 of main body 11 serves as the vertex of the acute angle between the first prong 14 and the main body 11. Similarly, the second prong 15 is connected to the main body 11 at an acute angle, which forms an additional crevice between the second prong 15 and the main body 11 to grasp and pull plants away from unwanted objects. This additional crevice is formed at the second end 13 of the main body 11 because the second end 13 of main body 11 serves as the vertex of the acute angle between the second prong 15 and the main body 11.

The pliable rod 7 is configured in a manner that allows the user to rake plants from both sides of the flexible guard 10. The proximal end 8 of the pliable rod 7 is mounted along with the main shaft 2 adjacent to the operative end 4 so that the pliable rod 7 is properly situated on the string trimmer 1. The distal end 9 of the pliable rod 7 is centrally connected to the flexible guard 10 so that the first prong 14 and the second prong 15 are on either side of the pliable rod 7. This allows the flexible guard 10 to be used to guide plants toward the spool and line assembly 5 from both the left side and the right side.

The present invention implements a number of optional features that can be used with the pliable rod 7 and the flexible guard 10 which are mentioned hereinafter. One such feature is a clamp 16 (FIG. 8), which is used in retrofit embodiments of the present invention when the flexible guard 10 and the pliable rod 7 are not already integrated into the string trimmer 1. The proximal end 8 of the pliable rod 7 is connected to the clamp 16, which allows the pliable rod 7 to be connected along the main shaft 2 of the string trimmer 1 by the clamp 16. The clamp 16 can be attached or detached from the main shaft 2, which is a necessary feature of the retrofit embodiment of the present invention. Another such feature is the pivotable joint 17, which allows the pliable rod 7 to pivot about its proximal end 8. The pivotable joint 17 allows the pliable rod 7 to drastically reposition the flexible guard 10. For example, if the flexible guard 10 acts as a nuisance in certain situations, the flexible guard 10 can be folded back onto the main shaft 2 of the string trimmer 1. The pivotable joint 17 can be, but is not limited to, a ball and socket joint or a hinged joint. Another such feature is a locking mechanism 18, which is mechanically integrated between the pivotable joint 17. The locking mechanism 18 is disengaged to allow the pliable rod 7 to pivot about its proximal end 8 so that the user can find the appropriate positioning for the pliable rod 7. The locking mechanism 18 is then engaged to fix the pliable rod 7 in place and, thus, fix the flexible guide in place.

Although the invention has been explained in relation to its preferred embodiment, it is to be understood that many other possible modifications and variations can be made without departing from the spirit and scope of the invention as hereinafter claimed.

What is claimed is:

1. A string trimmer comprises:
   a pliable rod;
   a flexible guard;
   a main shaft;
   a spool and line assembly;
   a rear shield;
   said main shaft comprises a control end and an operative end;
   said spool and line assembly being rotatably mounted to said operative end;
   said rear shield being positioned about said spool and line assembly;
   said rear shield being fixed to the main shaft adjacent to the operative end;
   said flexible guard being positioned about the spool and line assembly, opposite to the rear shield;
   said flexible guard being offset from the spool and line assembly;
   said flexible guard being suspended to the main shaft by the pliable rod;
   said flexible guard comprises a main body and a first prong;
   said first prong being connected to the main body at a first acute angle; and
   a first end of the main body being a vertex of said first acute angle between said first prong and said main body.

2. The string trimmer as claimed in claim 1 comprises:
   said flexible guard comprises a main body and a second prong;
   said second prong being connected to the main body at a second acute angle; and
   a second end of the main body being a vertex of said second acute angle between said second prong and said main body.

3. The string trimmer as claimed in claim 1 comprises:
   a clamp; and
   a proximal end of said pliable rod being connected along said main shaft by said clamp.

4. The string trimmer as claimed in claim 1 comprises:
   a pivotable joint; and
   a proximal end of said pliable rod being connected along said main shaft by said pivotable joint.

5. The string trimmer as claimed in claim 4 comprises:
   a locking mechanism; and
   said locking mechanism being mechanically integrated into the pivotable joint, wherein said locking mechanism is engaged to fix the pliable rod in place and is disengaged to move the pliable rod about the pivotable joint.

6. The string trimmer as claimed in claim 1 comprises:
   said pliable rod comprises a proximal end and a distal end;
   said proximal end being mounted along said main shaft adjacent to said operative end; and
   said distal end being centrally connected to said flexible guard.

7. A string trimmer comprises:
   a pliable rod;
   a flexible guard;
   a main shaft;
   a spool and line assembly;
   a rear shield;

said main shaft comprises a control end and an operative end;
said flexible guard comprises a main body, a first prong, and a second prong;
said spool and line assembly being rotatably mounted to said operative end;
said rear shield being positioned about said spool and line assembly;
said rear shield being fixed to the main shaft adjacent to the operative end;
said flexible guard being positioned about the spool and line assembly, opposite to the rear shield;
said flexible guard being offset from the spool and line assembly;
said flexible guard being suspended to the main shaft by the pliable rod;
said first prong being connected to the main body at a first acute angle;
a first end of the main body being a vertex of said first acute angle between said first prong and said main body;
said second prong being connected to the main body at a second acute angle; and
a second end of the main body being a vertex of said second acute angle between said second prong and said main body.

8. The string trimmer as claimed in claim 7 comprises:
a clamp; and
a proximal end of said pliable rod being connected along said main shaft by said clamp.

9. The string trimmer as claimed in claim 7 comprises:
a pivotable joint; and
a proximal end of said pliable rod being connected along said main shaft by said pivotable joint.

10. The string trimmer as claimed in claim 9 comprises:
a locking mechanism; and
said locking mechanism being mechanically integrated into the pivotable joint, wherein said locking mechanism is engaged to fix the pliable rod in place and is disengaged to move the pliable rod about the pivotable joint.

11. The string trimmer as claimed in claim 7 comprises:
said pliable rod comprises a proximal end and a distal end;
said proximal end being mounted along said main shaft adjacent to said operative end; and
said distal end being centrally connected to said flexible guard.

12. A string trimmer comprises:
a pliable rod;
a flexible guard;
a main shaft;
a spool and line assembly;
a rear shield;
said main shaft comprises a control end and an operative end;
said spool and line assembly being rotatably mounted to said operative end;
said rear shield being positioned about said spool and line assembly;
said rear shield being fixed to the main shaft adjacent to the operative end;
said flexible guard being positioned about the spool and line assembly, opposite to the rear shield;
said flexible guard being offset from the spool and line assembly;
said flexible guard being suspended to the main shaft by the pliable rod;
a clamp;
a proximal end of said pliable rod being connected along said main shaft by said clamp;
said flexible guard comprises a main body and a first prong;
said first prong being connected to the main body at a first acute angle; and
a first end of the main body being a vertex of said first acute angle between said first prong and said main body.

13. The string trimmer as claimed in claim 12 comprises:
said flexible guard comprises a main body and a second prong;
said second prong being connected to the main body at a second acute angle; and
a second end of the main body being a vertex of said second acute angle between said second prong and said main body.

14. The string trimmer as claimed in claim 12 comprises:
a pivotable joint; and
a proximal end of said pliable rod being connected along said main shaft by said pivotable joint.

15. The string trimmer as claimed in claim 14 comprises:
a locking mechanism; and
said locking mechanism being mechanically integrated into the pivotable joint, wherein said locking mechanism is engaged to fix the pliable rod in place and is disengaged to move the pliable rod about the pivotable joint.

16. The string trimmer as claimed in claim 14 comprises:
said pliable rod comprises a proximal end and a distal end;
said proximal end being mounted along said main shaft adjacent to said operative end; and
said distal end being centrally connected to said flexible guard.

* * * * *